United States Patent

Sano et al.

[11] Patent Number: 6,110,547
[45] Date of Patent: Aug. 29, 2000

[54] METHOD OF MOLDING AUTOMOBILE OUTER TRIM PART, LAMINATED FILM OR SHEET FOR USE THEREIN AND AUTOMOBILE OUTER TRIM PART

[75] Inventors: Yutaka Sano; Shigehiro Asano; Satoshi Matsuura, all of Ichihara; Tsutomu Okano, Kariya; Haruo Fukuda, Kariya; Toshihiko Inagaki, Kariya, all of Japan

[73] Assignees: Grand Polymer Co., Ltd., Tokyo; Toyota Shatai Kabushiki Kaisha, Aichi, both of Japan

[21] Appl. No.: 09/053,080

[22] Filed: Apr. 1, 1998

[30] Foreign Application Priority Data

Apr. 1, 1997 [JP] Japan .................................. 9-082918

[51] Int. Cl.[7] .......................... B60R 13/00; B29C 45/00
[52] U.S. Cl. .......................... 428/31; 428/515; 264/259; 264/511
[58] Field of Search .................. 428/31, 67, 411.1, 428/500, 515, 908.8, 46; 156/245, 242, 60; 264/101, 500, 510, 511, 513, 571, 259

[56] References Cited

U.S. PATENT DOCUMENTS

| Re. 35,739 | 2/1998 | Ellison et al. | 428/31 |
|---|---|---|---|
| Re. 35,894 | 9/1998 | Ellison et al. | 428/46 |
| Re. 35,970 | 11/1998 | Ellison et al. | 428/31 |
| 4,810,540 | 3/1989 | Ellison et al. | 428/31 |
| 4,931,324 | 6/1990 | Ellison et al. | 428/31 |
| 5,360,868 | 11/1994 | Mosier et al. | 525/89 |
| 5,536,539 | 7/1996 | Ellison et al. | 428/31 |
| 5,599,608 | 2/1997 | Yamamoto et al. | 428/192 |
| 5,712,003 | 1/1998 | Suenaga et al. | 428/31 |
| 5,750,600 | 5/1998 | Nozokido et al. | 524/100 |

FOREIGN PATENT DOCUMENTS

| 0259020 | 3/1988 | European Pat. Off. . |
|---|---|---|
| 259020A2 | 3/1988 | European Pat. Off. . |
| 0296750 | 12/1988 | European Pat. Off. . |
| 296750A2 | 12/1988 | European Pat. Off. . |
| 0371743 | 6/1990 | European Pat. Off. . |
| 371743A2 | 6/1990 | European Pat. Off. . |
| 0518542 | 12/1992 | European Pat. Off. . |
| 0663281 | 7/1995 | European Pat. Off. . |
| 663281A2 | 7/1995 | European Pat. Off. . |
| 10225977 | 8/1998 | Japan . |
| WO 9324292 | 12/1993 | WIPO . |

OTHER PUBLICATIONS

*Plastics World*, "Is Dry Paint in Your Future?" by Jan H. Schut et al., Jul. 1996, pp. 48–52.

*Primary Examiner*—Paul Thibodeau
*Assistant Examiner*—Sheeba Ahmed
*Attorney, Agent, or Firm*—Birch, Stewart, Kolasch & Birch, LLP

[57] ABSTRACT

Disclosed is a method of molding an automobile outer trim part, including the steps of: (1) providing a film or sheet comprising a colored layer composed of a propylene polymer composition and, laminated thereto, a clear layer composed of a propylene homopolymer, (a) heating the laminated film or sheet, (3) feeding the heated laminated film or sheet into a metal mold including a pair of dies, (4) closing the metal mold so that the laminated film or sheet is shaped into desired configuration, (5) loosing the closed metal mold, and (6) injecting a thermoplastic polymer onto the side of the colored layer of the metal mold so that the shaped laminated film or sheet is united with a substrate layer of the thermoplastic polymer. The above propylene polymer composition comprises in a specified proportion a polypropylene block copolymer and/or polypropylene random copolymer exhibiting a specified intrinsic viscosity, a polyethylene exhibiting a specified intrinsic viscosity, an elastomer composed of a copolymer of ethylene and an α-olefin exhibiting a specified intrinsic viscosity and a colorant. The above method enables providing an automobile outer trim part having the same colored appearance and texture as those of painted part, irrespective of the avoidance of a printing step.

10 Claims, No Drawings

METHOD OF MOLDING AUTOMOBILE OUTER TRIM PART, LAMINATED FILM OR SHEET FOR USE THEREIN AND AUTOMOBILE OUTER TRIM PART

FIELD OF THE INVENTION

The present invention relates to a method of molding an automobile outer trim part, a laminated film or sheet for use in the method and an automobile outer trim part.

BACKGROUND OF THE INVENTION

Outer trim parts for automobiles, made of polymeric materials, are commonly colored by painting after the molding thereof. Although it is known that polymeric materials can be colored by blending pigments or dyes therein, realizing coloring conditions equivalent to the colored appearance and texture exhibited by painted metal materials for use in, for example, automobiles is so difficult that, as mentioned above, the automobile outer trim parts are painted after the molding thereof.

However, there is a problem such that the yield in painting step is low because of product deformation attributed to heat applied at the painting or because of painting irregularity to thereby result in a poor productivity. There is another problem such that a wide space is required for drying the paint to thereby render a layout of production line for automobile outer trim parts difficult. There is a further problem such that the conventional painting uses volatile toxic solvents, so that not only is work environment deteriorated but also a waste liquid treatment is to be coped with.

Methods of producing colored automobile outer trim parts, which realize the same appearance and texture as those of the conventional painted automobile outer trim parts composed of polymeric materials without the need to conduct painting, have recently been proposed with a view toward improving work environment and attaining cost reduction.

For example, a technique of coloring the surface of an automobile outer trim into a colored condition similar to that of the painted item with the use of a polymer film is introduced on page 48 of PLASTICS WORLD, July, 1996. The polymer film introduced thereon has a three-layer structure comprising a polyvinyl fluoride film and, sequentially laminated thereto, an acrylic resin layer and a pigment containing polyester layer.

However, the use of this polymer film encounters a problem such that high cost is inevitable because of the use of expensive fluoropolymer and acrylic resin, and also involves the danger that an interlayer separation would occur because of the lamination of different types of materials whose bonding is difficult. Moreover, this polymer film includes an easily hydrolyzable polyester, so that, when exposed to the weather or used in outer trim parts of automobiles driven on the beach or riverbed, the polyester layer reacts with water to thereby deteriorate and, hence, cause the danger of discoloration or peeling.

With respect to the recovery and recycling of automobile outer trim parts at the time of scrapping of automobiles, the above polymer film is a laminate of different types of materials, so that a material classification and collection of classified material are inevitable to thereby rather cause high cost. Thus, even if this polymer film is intended to be incinerated, the problem is encountered that a hazardous gas would be generated at the time of the incineration.

Apart from the above three-layer structured polymer film, it is also known to ploy a three-layer film comprising a surface layer of an acrylic polymer or fluoropolymer, a colored layer of a vinyl chloride polymer and a layer of a polypropylene or polyvinylidene fluoride which is easily bonded to a substrate.

However, being similar to the above mentioned polymer film, this three-layer film is a laminate of different types of materials and employs expensive fluoropolymer and acrylic resin, so that the use of the three-layer film encounters the same problems as experienced by the above mentioned polymer film.

Therefore, there is a demand for the development of a method of molding an automobile outer trim part which can be recycled and incinerated, and which exhibits the same colored appearance and texture as those of the painted part, irrespective of the avoidance of painting step, while exhibiting durability in water and which is fundamentally composed only of polymer. Further, there is a demand for the development of a laminated film or sheet for use in the molding method and an automobile outer trim part.

OBJECT OF THE INVENTION

The present invention has been made with a view toward solving the above problems of the prior art. It is an object of the present invention to provide a method of molding, mainly from polypropylene polymers, an automobile outer trim part which exhibits the same colored appearance and texture as those of the painted part, irrespective of the avoidance of painting step. Other objects of the present invention are to provide a laminated film or sheet for use in the molding method and to provide an automobile outer trim part.

SUMMARY OF THE INVENTION

The first method of molding an automobile outer trim part according to the present invention comprises the steps of:

providing a film or sheet comprising a colored layer (I) being composed of a propylene polymer composition (A) of the below specified formulation and having a thickness of 150 to 1000 $\mu$m and, laminated thereto, a clear layer (II) being composed of a propylene homopolymer (B) and having a thickness of 10 to 100 $\mu$m, through which light is transmitted so that the color of the colored layer (I) is visible;

heating the laminated film or sheet;

feeding the heated laminated film or sheet into a metal mold including a pair of dies;

closing the metal mold so that the laminated film or sheet is shaped into desired configuration;

loosing the closed metal mold or replacing one of the dies by another die; and injecting a thermoplastic polymer (C) onto the side of the colored layer (I) of the metal mold so that the shaped laminated film or sheet is united with a substrate layer of the thermoplastic polymer (C).

The above propylene polymer composition (A) comprises:

(a) 50 to 90% by weight of a polypropylene block copolymer (a1) and/or polypropylene random copolymer (a2) exhibiting an intrinsic viscosity ($\eta$), as measured in 135° C. decalin, of 2.0 to 4.0 dl/g, (b) 5 to 45% by weight of a polyethylene exhibiting an intrinsic viscosity ($\eta$), as measured in 135° C. decalin, of 1.0 to 5.0 dl/g, (c) 5 to 45% by weight of an elastomer composed of a copolymer of ethylene and an $\alpha$-olefin having 3 to 10 carbon atoms, this copolymer exhibiting an intrinsic viscosity (η), as measured in 135° C. decalin, of 1.0 to 3.0 dl/g, and (d) 0.1 to 20 parts by weight, per 100 parts by weight of the sum of the components (a), (b) and (c), of a colorant.

The above propylene polymer composition (A) may contain (e) talc (e1) and/or magnesium sulfate fibers (e2) in an amount of up to 10 parts by weight per 100 parts by weight of the sum of the above components (a), (b) and (c).

The second method of molding an automobile outer trim part according to the present invention comprises the steps of:

providing a film or sheet comprising a colored layer (I) being composed of the above propylene polymer composition (A) and having a thickness of 150 to 1000 μm and, laminated thereto, a clear layer (II) being composed of a propylene homopolymer (B) and having a thickness of 10 to 100 μm, through which light is transmitted so that the color of the colored layer (I) is visible;

feeding the laminated film or sheet into a metal mold including a pair of dies;

heating the laminated film or sheet;

closing the metal mold so that the laminated film or sheet is shaped into desired configuration;

loosing the closed metal mold or replacing one of the dies by another die; and injecting a thermoplastic polymer (C) onto the side of the colored layer (I) of the metal mold so that the shaped laminated film or sheet is united with a substrate layer of the thermoplastic polymer (C).

The laminated film or sheet of the present invention comprises a colored layer (I) being composed of a propylene polymer composition (A) and having a thickness of 150 to 1000 μm and, laminated thereto, a clear layer (II) being composed of a propylene homopolymer (B) and having a thickness of 10 to 100 μm, through which light is transmitted so that the color of the colored layer (I) is visible;

the above propylene polymer composition (A) comprising:

(a) 50 to 90% by weight of a polypropylene block copolymer (a1) and/or polypropylene random copolymer (a2) exhibiting an intrinsic viscosity (η), as measured in 135° C. decalin, of 2.0 to 4.0 dl/g, (b) 5 to 45% by weight of a polyethylene exhibiting an intrinsic viscosity (η), as measured in 135° C. decalin, of 1.0 to 5.0 dl/g, (c) 5 to 45% by weight of an elastomer composed of a copolymer of ethylene and an α-olefin having 3 to 10 carbon atoms, this copolymer exhibiting an intrinsic viscosity (η), as measured in 135° C. decalin, of 1.0 to 3.0 dl/g, and (d) 0.1 to 20 parts by weight, per 100 parts by weight of the sum of the components (a), (b) and (c), of a colorant;

the above propylene homopolymer (B) exhibiting an intrinsic viscosity (η), as measured in 135° C. decalin, of 2.0 to 4.0 dl/g;

the above laminated film or sheet having, at surface of the clear layer (II), a surface hardness (pencil hardness measured in accordance with ASTM D 696) of B or higher and a surface gloss (measured in accordance with ASTM D 648) of at least 75%.

The automobile outer trim part of the present invention is a colored automobile outer trim part which comprises a substrate layer of a thermoplastic polymer (C) and, sequentially laminated thereto, a colored layer (I) being composed of a propylene polymer composition (A) and having a thickness of 150 to 1000 μm and a clear layer (II) being composed of a propylene homopolymer (B) and having a thickness of 10 to 100 μm, through which light is transmitted so that the color of the colored layer (I) is visible;

the above propylene polymer composition (A) comprising:

(a) 50 to 90% by weight of a polypropylene block copolymer (a1) and/or polypropylene random copolymer (a2) exhibiting an intrinsic viscosity (η), as measured in 135° C. decalin, of 2.0 to 4.0 dl/g, (b) 5 to 45% by weight of a polyethylene exhibiting an intrinsic viscosity (η), as measured in 135° C. decalin, of 1.0 to 5.0 dl/g, (c) 5 to 45% by weight of an elastomer composed of a copolymer of ethylene and an α-olefin having 3 to 10 carbon atoms, this copolymer exhibiting an intrinsic viscosity (η), as measured in 135° C. decalin, of 1.0 to 3.0 dl/g, and (d) 0.1 to 20 parts by weight, per 100 parts by weight of the sum of the components (a), (b) and (c), of a colorant;

the above propylene homopolymer (B) exhibiting an intrinsic viscosity (η), as measured in 135° C. decalin, of 2.0 to 4.0 dl/g, the above automobile outer trim part having, at surface of the clear layer (II), a surface hardness (pencil hardness measured in accordance with ASTM D 696) of B or higher and a surface gloss (measured in accordance with ASTM D 648) of at least 75%; and the above automobile outer trim part having a flexural modulus (measured in accordance with ASTM D 790) of at least 500 MPa.

The automobile outer trim part of the present invention can be produced by the above first and second methods of molding an automobile outer trim part according to the present invention.

DETAILED DESCRIPTION OF THE INVENTION

The method of molding an automobile outer trim part, laminated film or sheet for use in the method and automobile outer trim part according to the present invention will be described in detail below.

First, the method of molding an automobile outer trim part according to the present invention will be described below.

In the present invention, a colored layer (I) composed of a propylene polymer composition (A) and a clear layer (II) composed of a propylene homopolymer (B), which constitutes an outermost layer of an outer trim part, exhibits the same gloss and texture as those of the painted part and protects the colored layer (I) from sand, tar and rain, are sequentially laminated to a substrate as an automobile outer trim part and united together so that a plastic-made automobile outer trim part which exhibits the same appearance and texture as those of the painted part, irrespective of the avoidance of painting step, can be provided.

Accordingly, a laminated film or sheet comprising the colored layer composed of a propylene polymer composition (A) and the clear layer composed of a propylene homopolymer (B) is prepared and molded into given configuration of an automobile outer trim part to be produced (configuration of the colored surface side of the automobile outer trim part).

This molding into given configuration is accomplished by heating the above laminated film or sheet and transferring the pattern of the metal mold to the heated laminated film or sheet. With respect to the molding method, the vacuum forming or pressure forming is preferred from the viewpoint of industrial productivity. In the vacuum forming or pressure forming, common molding conditions can satisfactorily be employed.

The heating required in the molding of the laminated film or sheet into given configuration can be performed prior to feeding the laminated film or sheet into the metal mold or after the feeding of the laminated film or sheet into the metal mold.

In the molding of the laminated film or sheet into given configuration, generally, the heated laminated film or sheet is arranged in a pair of dies of a metal mold, the one male and the other female, designed for molding a final product, the metal mold is then closed, and the above vacuum forming or pressure forming is further performed.

In the feeding of the laminated film or sheet into the metal mold, the laminated film or sheet may be cut into a size suitable to the metal mold and thereafter fed into the metal mold. Alternatively, the laminated film or sheet in rolled continuous form may be cut into given size just prior to or after the feeding into the metal mold and shaped.

After the vacuum forming or pressure forming of the above laminated film or sheet, the closed metal mold is loosed to thereby create in the metal mold a space to be filled with a substrate forming thermoplastic polymer (C). The thermoplastic polymer (C) is injected by an injection molding machine through its nozzle into the thus obtained space, so that a substrate layer composed of the thermoplastic polymer (C) and the above laminated film or sheet are united together by the heat of the thermoplastic polymer (C).

In the present invention, alternatively, the following procedure may be effected. That is, after the vacuum forming or pressure forming of the laminated film or sheet into given configuration, one of the dies of the metal mold is replaced by another die to thereby create in the metal mold a space to be filled with a substrate forming thermoplastic polymer (C). The thermoplastic polymer (C) is injected by an injection molding machine through its nozzle into the thus obtained space, so that a substrate layer composed of the thermoplastic polymer (C) and the above laminated film or sheet are united together by the heat of the thermoplastic polymer (C).

In the laminated film or sheet for use in the above molding, the thickness of the colored layer (I) is in the range of 150 to 1000 $\mu$m, preferably, 200 to 600 $\mu$m. The thickness of the clear layer (II) is in the range of 10 to 100 $\mu$m, preferably, 20 to 50 $\mu$m.

The propylene polymer composition (A) employed for forming the above colored layer (I) comprises:

(a) 50 to 90% by weight, preferably, 60 to 80% by weight of a polypropylene block copolymer (a1) and/or polypropylene random copolymer (a2) exhibiting an intrinsic viscosity ($\eta$), as measured in 135° C. decalin, of 2.0 to 4.0 dl/g, preferably, 2.4 to 3.5 dl/g;

(b) 5 to 45% by weight, preferably, 10 to 30% by weight of a polyethylene exhibiting an intrinsic viscosity ($\eta$), as measured in 135° C. decalin, of 1.0 to 5.0 dl/g, preferably, 1.2 to 4.4 dl/g;

(c) 5 to 45% by weight, preferably, 10 to 30% by weight of an elastomer composed of a copolymer of ethylene and an $\alpha$-olefin having 3 to 10 carbon atoms, this copolymer exhibiting an intrinsic viscosity ($\eta$), as measured in 135° C. decalin, of 1.0 to 3.0 dl/g, preferably, 1.5 to 2.5 dl/g; and (d) 0.1 to 20 parts by weight, preferably, 1.0 to 10 parts by weight, per 100 parts by weight of the sum of the components (a), (b) and (c), of a colorant; optionally together with (e) up to 30 parts by weight, preferably, 5 to 15 parts by weight, per 100 parts by weight of the sum of the components (a), (b) and (c), of talc (e1) and/or magnesium sulfate fibers (e2).

The above propylene homopolymer (B) forming the clear layer (II) exhibits an intrinsic viscosity ($\eta$), as measured in 135° C. decalin, of 2.0 to 4.0 dl/g, preferably, 2.4 to 3.5 dl/g.

The above laminated film or sheet has, at surface of the clear layer (II), a surface hardness (pencil hardness measured in accordance with ASTM D 696) of B or higher, preferably, HB or higher and a surface gloss (measured in accordance with ASTM D 648) of at least 75%, preferably, at least 80%.

By virtue of the employment of the above structure, the laminated film or sheet of the present invention exerts such an effect that it uniformly sticks to an inner wall of the metal mold at the vacuum forming or pressure forming, thereby enabling obtaining a film or sheet which is free of thickness irregularity and to which protrudent and recess pattern is beautifully transferred. Moreover, after the unification with the substrate layer-forming thermoplastic polymer (C), such an effect is exerted that the same gloss, tone and texture as those of the painted part are exhibited.

The above thermoplastic polymer (C) is united with the laminated film or sheet molded into given configuration to thereby form a substrate layer. Although the thermoplastic polymer (C) is not particularly limited as long as the polymer is thermoplastic, it is preferred that the thermoplastic polymer (C) be the same polyolefin as employed in the formation of the above laminated film or sheet.

The above polyolefin is, for example, polyethylene, polypropylene, poly(4-methyl-1-pentene), poly(1-butene) or poly(3-methyl-1-butene).

The above thermoplastic polymer (C) may be blended with any of various thermoplastic elastomers and an organic or inorganic filler.

The automobile outer trim part obtained by uniting the laminated film or sheet molded into given configuration in the above manner with the substrate layer has a surface hardness (pencil hardness measured in accordance with ASTM D 696) of B or higher, preferably, HB or higher, a surface gloss (measured in accordance with ASTM D 648) of at least 75%, preferably, at least 80%, and a flexural modulus of molded part (measured in accordance with ASTM D 790) of at least 500 MPa, preferably, 500 to 4000 MPa.

EFFECT OF THE INVENTION

The method of molding an automobile outer trim part according to the present invention enables providing an automobile outer trim part which exhibits the same colored appearance and texture as those of the painted part, irrespective of the avoidance of painting step.

The laminated film or sheet of the automobile outer trim part is composed mainly of polypropylene polymer, so that the automobile outer trim part exhibits high durability in wind, rain, seawater and river water, and can be easily recycled and, even when incinerated, does not generate hazardous gas. Moreover, in the method of molding an automobile outer trim part according to the present invention, the painting step is avoided, so that the problems of work environment and waste liquid disposal are eliminated as well as the paint drying booth becomes unnecessary to thereby resolve the space restriction on plant location attributed to the need of the paint drying booth. Further, the problem of yield lowering at the painting step is eliminated, so that a productivity is improved to thereby enable reducing the cost of automobile outer trim part.

EXAMPLE

The present invention will now be described with reference to the following Examples and Comparative Examples.

The materials used in the Examples and Comparative Examples are as follows:

(1) polypropylene block copolymer (a-1)
   intrinsic viscosity ($\eta$) as measured in 135° C. decalin: 3.1 dl/g, and
   ethylene content: 7.6% by weight;

(2) polypropylene random copolymer (a-2)
   intrinsic viscosity ($\eta$) as measured in 135° C. decalin: 3.1 dl/g, and
   ethylene content: 3.0% by weight;

(3) high-density polyethylene (b-1)
   intrinsic viscosity ($\eta$) as measured in 135° C. decalin: 2.5 dl/g,
   density: 0.964 g/cm$^3$ and
   ethylene content: 100% by weight;

(4) low-density polyethylene (b-2)
   intrinsic viscosity ($f$) as measured in 135° C. decalin: 1.4 dl/g,
   density: 0.920 g/cm$^3$ and
   ethylene content: 100% by weight;

(5) ethylene/1-butene copolymer rubber (c-1)
   intrinsic viscosity ($\eta$) as measured in 135° C. decalin: 1.5 dl/g,
   density: 0.88 g/cm$^3$ and
   ethylene content: 80% by weight;

(6) ethylene/propylene copolymer rubber (c-2)
   intrinsic viscosity ($\eta$) as measured in 135° C. decalin: 1.9 dl/g,
   density: 0.87 g/cm$^3$ and
   ethylene content: 74% by weight;

(7) propylene/ethylene copolymer rubber (c-3)
   intrinsic viscosity ($\eta$) as measured in 135° C. decalin: 2.47 dl/g,
   density: 0.86 g/cm$^3$ and
   ethylene content: 40% by weight; and (8) polypropylene homopolymer (B-1)
   intrinsic viscosity ($\eta$) as measured in 135° C. decalin: 3.0 dl/g.

Example 1

5 parts by weight of a metallic pigment was blended with 100 parts by weight of polymer composition consisting of 70 parts by weight of polypropylene random copolymer (a-2), 20 parts by weight of high-density polyethylene (b-1) and 10 parts by weight of ethylene/1-butene copolymer rubber (c-1). The thus obtained propylene polymer composition and the polypropylene homopolymer (B-1) were extruded by means of a double-layer extruder into a laminated sheet (total thickness: 500 $\mu$m) consisting of a clear layer, with a thickness of 50 $\mu$m, composed of the polypropylene homopolymer and a 450 $\mu$m thick colored layer, with a thickness of 450 $\mu$m, composed of the propylene polymer composition.

The surface hardness and surface gloss of the clear layer of the obtained laminated sheet are given in Table 1.

Thereafter, the laminated sheet was heated to 150° C. and fed into a metal mold including a pair of dies. The metal mold was closed and a vacuum forming of the heated laminated sheet into given configuration was performed under the following conditions.

Vacuum Forming Conditions
   machine: vacuum forming/pressure forming machine manufactured by Fuse Sinku Kabushiki Kaisha,
   metal mold: concave drawn cup shape (having a diameter of 100 mm and a depth of 50 mm),
   heater temperature: 380° C.,
   sheet surface temperature: 150° C., and
   molding method: the sheet was set with the surface (homopolymer layer) of the laminated sheet down and heated by means of a heater disposed upside until the surface temperature reached given value, and a vacuum forming thereof was conducted.

After the vacuum forming, the appearance of the thus obtained sheet and the surface gloss thereof on the side of the clear layer are given in Table 1.

Thereafter, the closed metal mold was loosed, and polypropylene block copolymer (a-1) melted at 230° C. was injected under the following conditions onto the side of the colored layer of the laminated sheet within the metal mold so as to be united with the shaped sheet.

Injection Molding Conditions
   machine: Multifunctional injection molding machine manufactured by Mitsubishi Heavy Industries, Ltd.,
   molding temperature: 225° C.,
   injection pressure: 75 MPa,
   holding pressure: 37 MPa, and
   cooling time: 50 sec.

The surface hardness, surface gloss and flexural modulus of the obtained molded item (product) are given in Table 1.

The appearance and surface gloss of the laminated sheet having undergone the vacuum forming were visually inspected. The results are given in Table 1.

Criterion for Appearance Evaluation
   AA: creases and other defects detrimental to appearance were not observed,
   BB: creases and other defects detrimental to appearance were substantially not observed,
   CC: creases and other defects detrimental to appearance were observed, and
   DD: a large number of creases and other defects detrimental to appearance were observed.

Criterion for Surface Gloss Evaluation
   AA: surface gloss drop by molding was slight,
   BB: surface gloss drop by molding was observed, and
   CC: surface gloss drop by molding was extremely large.

Examples 2 to 7 and Comparative Examples 1 and 2

Laminated sheets having the thicknesses specified in Table 1 were obtained in the same manner as in Example 1, except that use was made of the propylene polymer compositions of formulations specified in Table 1.

Molded items (products) were prepared from the laminated sheets in the same manner as in Example 1, except that the sheet heating temperatures listed in Table 1 were employed. The surface hardness, surface gloss and flexural modulus of the obtained molded items are given in Table 1.

Example 8

The laminated sheet obtained in Example 1 was fed into a metal mold including a pair of dies and heated to 150° C.

The metal mold was closed and a pressure forming of the laminated sheet into given configuration was performed. One of the dies was replaced by another die, and polypropylene block copolymer (a-1) was injected onto the side of the colored layer of the laminated sheet within the metal mold so as to be united with the laminated sheet having been formed into given configuration. The thus obtained molded item (product) had excellent surface and exhibited the same appearance as that of the painted item.

TABLE 1

|  | Example | | | | |
|---|---|---|---|---|---|
|  | 1 | 2 | 3 | 4 | 5 |
| Formulation of propylene polymer composition. (pts. wt.) | | | | | |
| polypropylene block copolymer (a-1) | — | — | 70 | 70 | 70 |
| polypropylene random copolymer (a-2) | 70 | 70 | — | — | — |
| high-density polyethylene (b-1) | 20 | 20 | 20 | — | — |
| low-density polyethylene (b-2) | — | — | — | 20 | 20 |
| ethylene/i-butene copolymer rubber (c-1) | 10 | 10 | — | — | — |
| ethylene/propylene copolymer rubber (c-2) | — | — | 10 | 10 | 10 |
| propylene/ethylene copolymer rubber (c-3) | — | — | — | — | — |
| Polypropylene homopolymer (pts. wt.) polypropylene homopolymer (B-1) Laminated sheet | 100 | 100 | 100 | 100 | 100 |
| thickness (clear layer/colored layer) | 50/450 | 35/315 | 50/450 | 50/450 | 35/315 |
| surface hardness (pencil hardness) | HB | HB | HB | HB | HB |
| surface gloss [%] | 85 | 89 | 84 | 88 | 93 |
| Method of molding laminated sheet into given configuration | vac. | vac. | vac. | vac. | vac. |
| Laminated sheet heating temperature [° C.] Laminated sheet | 150 | 130 | 150 | 150 | 150 |
| appearance after molding | BB | BB | BB | AA | BB |
| surface gloss after molding Product | AA | BB | AA | AA | BB |
| surface hardness (pencil hardness) | HB | HB | HB | HB | HB |
| surface gloss [%] | 81 | 85 | 80 | 85 | 88 |
| flexural modulus [MPa] | 1370 | 1386 | 1382 | 1329 | 1356 |

|  | Example | | Comparative Example | |
|---|---|---|---|---|
|  | 6 | 7 | 1 | 2 |
| Formulation of propylene polyrner composition (pts. wt.) | | | | |
| polypropylene block copolymer (a-1) | — | 65 | — | — |
| polypropylene random copolymer (a-2) | 70 | — | 70 | 100 |
| high-density polyethylene (b-1) | 20 | — | — | — |
| low-density polyethylene (b-2) | — | 20 | — | — |
| ethylene/1-butene copolymer rubber (c-1) | — | — | 30 | — |
| ethylene/propylene copolymer rubber (c-2) | 10 | 10 | — | — |
| propylene/ethylene copolymer rubber (c-3) | — | 5 | — | — |
| Polypropylene homopolymer (pts. wt.) polypropylene homopolymer (B-1) Laminated sheet | 100 | 100 | 100 | 100 |
| thickness (clear layer/colored layer) [μm] | 50/450 | 50/450 | 50/450 | 50/450 |
| surface hardness (pencil hardness) | HB | HB | HB | HB |
| surface gloss [%] | 88 | 89 | 86 | 90 |
| Method of molding laminated sheet into given configuration | vac. | vac. | vac. | vac. |
| Laminated sheet heating temperature [° C.] Laminated sheet | 150 | 150 | 150 | 135 |
| appearance after molding | CC | AA | DD | DD |
| surface gloss after molding Product | AA | AA | AA | BB |
| surface hardness (pencil hardness) | HB | HB | B | HB |
| surface gloss [%] | 83 | 84 | 85 | 84 |
| flexural modulus [MPa] | 1361 | 1322 | 1324 | 1351 |

Note: vac. means a vacuum forming.

What is claimed is:

1. A method of molding an automobile outer trim part, comprising the steps of:

proviidng a film or sheet comprising a colored layer (I) being composed of a propylene polymer composition (A) and having a thickness of 150 to 1000 μm and, laminated thereto, a clear layer (II) being composed of a propylene homopolymer (B) and having a thickness of 10 to 100 μm, through which light is transmitted so that the color of the colored layer (I) is visible, said propylene polymer composition (A) comprising:
(a) 50 to 90% by weight of a polypropylene block copolymer (a1) and/or polypropylene random copolymer (a2) exhibiting an intrinsic viscosity (η), as measured in 135° C. decalin, of 2.0 to 4.0 dl/g,
(b) 5 to 45% by weight of a polyethylene exhibiting an intrinsic viscosity (η), as measured in 135° C. decalin, of 1.0 to 5.0 dl/g,
(c) 5 to 45% by weight of an elastomer composed of a copolymer of ethylene and an α-olefin having 3 to 10 carbon atoms, said copolymer exhibiting an intrinsic viscosity (η) as measured in 135° C. decalin, of 1.0 to 3.0 dl/g, and
(d) 0.1 to 20 parts by weight, per 100 parts by weight of the sum of the components (a), (b) and (c), of a colorant;

heating the laminated film or sheet;
feeding the heated laminated film or sheet into a metal mold including a pair of dies;
closing the metal mold so that the laminated film or sheet is shaped into desired configuration;
loosening the closed metal mold or replacing one of the dies by another die; and injecting a thermoplastic polymer (C) onto the side of the colored layer (I) of the metal mold so that the shaped laminated film or sheet is united with a substrate layer of the thermoplastic polymer (C).

2. The method as claimed in claim 1, wherein the intrinsic viscosity (η), as measured in 135° C. decalin, of the propylene homopolymer (B) ranges from 2.0 to 4.0 dl/g.

3. The method as claimed in claim 1, wherein the laminated film or sheet is shaped into desired configuration according to vacuum forming or pressure forming technique.

4. A method of molding an automobile outer trim part, comprising the steps of:

providing a film or sheet comprising a colored layer (I) being composed of a propylene polymer composition (A) and having a thickness of 150 to 1000 μm and, laminated thereto, a clear layer (II) being composed of a propylene homopolymer (B) and having a thickness of 10 to 100 μm, through which light is transmitted so that the color of the colored layer (I) is visible, said propylene polymer composition (A) comprising:
   (a) 50 to 90% by weight of a polypropylene block copolymer (a1) and/or polypropylene random copolymer (a2) exhibiting an intrinsic viscosity (η), as measured in 135° C. decalin, of 2.0 to 4.0 dl/g,
   (b) 5 to 45% by weight of a polyethylene exhibiting an intrinsic viscosity (η), as measured in 135° C. decalin, of 1.0 to 5.0 dl/g,
   (c) 5 to 45% by weight of an elastomer composed of a copolymer of ethylene and an α-olefin having 3 to 10 carbon atoms, said copolymer exhibiting an intrinsic viscosity (η), as measured in 135° C. decalin, of 1.0 to 3.0 dl/g, and
   (d) 0.1 to 20 parts by weight, per 100 parts by weight of the sum of the components (a), (b) and (c), of a colorant;

feeding the laminated film or sheet into a metal mold including a pair of dies;

heating the laminated film or sheet;

closing the metal mold so that the laminated film or sheet is shaped into desired configuration;

loosening the closed metal mold or replacing one of the dies by another die; and injecting a thermoplastic polymer (C) onto the side of the colored layer (I) of the metal mold so that the shaped laminated film or sheet is united with a substrate layer of the thermoplastic polymer (C).

5. The method as claimed in claim 4, wherein the intrinsic viscosity (η), as measured in 135° C. decalin, of the propylene homopolymer (B) ranges from 2.0 to 4.0 dl/g.

6. The method as claimed in claim 4, wherein the laminated film or sheet is shaped into desired configuration according to vacuum forming or pressure forming technique.

7. A laminated film or sheet comprising a colored layer (I) being composed of a propylene polymer composition (A) and having a thickness of 150 to 1000 μm and, laminated thereto, a clear layer (II) being composed of a propylene homopolymer (B) and having a thickness of 10 to 100 μm, through which light is transmitted so that the color of the colored layer (I) is visible;

said propylene polymer composition (A) comprising:
   (a) 50 to 90% by weight of a polypropylene block copolymer (a1) and/or polypropylene random copolymer (a2) exhibiting an intrinsic viscosity (η), as measured in 135° C. decalin, of 2.0 to 4.0 dl/g,
   (b) 5 to 45% by weight of a polyethylene exhibiting an intrinsic viscosity (η), as measured in 135° C. decalin, of 1.0 to 5.0 dl/g,
   (c) 5 to 45% by weight of an elastomer composed of a copolymer of ethylene and an α-olefin having 3 to 10 carbon atoms, said copolymer exhibiting an intrinsic viscosity (η), as measured in 135° C. decalin, of 1.0 to 3.0 dl/g, and
   (d) 0.1 to 20 parts by weight, per 100 parts by weight of the sum of the components (a), (b) and (c), of a colorant;

said propylene homopolymer (B) exhibiting an intrinsic viscosity (η), as measured in 135° C. decalin, of 2.0 to 4.0 dl/g; and said laminated film or sheet having, at surface of the clear layer (II), a surface hardness of B or higher and a surface gloss of at least 75%.

8. A colored automobile outer trim part comprising a substrate layer of a thermoplastic polymer (C) and, sequentially laminated thereto, a colored layer (I) being composed of a propylene polymer composition (A) and having a thickness of 150 to 1000 μm and a clear layer (II) being composed of a propylene homopolymer (B) and having a thickness of 10 to 100 μm, through which light is transmitted so that the color of the colored layer (I) is visible;

said propylene polymer composition (A) comprising:
   (a) 50 to 90% by weight of a polypropylene block copolymer (a1) and/or polypropylene random copolymer (a2) exhibiting an intrinsic viscosity (η), as measured in 135° C. decalin, of 2.0 to 4.0 dl/g,
   (b) 5 to 45% by weight of a polyethylene exhibiting an intrinsic viscosity (η), as measured in 135° C. decalin, of 1.0 to 5.0 dl/g,
   (c) 5 to 45% by weight of an elastomer composed of a copolymer of ethylene and an α-olefin having 3 to 10 carbon atoms, said copolymer exhibiting an intrinsic viscosity (η), as measured in 135° C. decalin, of 1.0 to 3.0 dl/g, and
   (d) 0.1 to 20 parts by weight, per 100 parts by weight of the sum of the components (a), (b) and (c), of a colorant;

said propylene homopolymer (B) exhibiting an intrinsic viscosity (η), as measured in 135° C. decalin, of 2.0 to 4.0 dl/g;

said automobile outer trim part having, at surface of the clear layer (II), a surface hardness of B or higher and a surface gloss of at least 75%; and said automobile outer trim part having a flexural modulus of at least 500 MPa.

9. The method as claimed in claim 2, wherein the laminated film or sheet is shaped into desired configuration according to vacuum forming or pressure forming technique.

10. The method as claimed in claim 5, wherein the laminated film or sheet is shaped into desired configuration according to vacuum forming or pressure forming technique.

* * * * *